US012626537B2

(12) United States Patent
Shioda et al.

(10) Patent No.: US 12,626,537 B2
(45) Date of Patent: May 12, 2026

(54) AUTHENTICATION APPARATUS, AUTHENTICATION METHOD, AND RECORDING MEDIUM

(71) Applicant: PFU LIMITED, Ishikawa (JP)

(72) Inventors: Kengo Shioda, Ishikawa (JP); Satoshi Usho, Ishikawa (JP); Mitsuhiro Katsuizumi, Ishikawa (JP); Yuka Awazu, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 358 days.

(21) Appl. No.: 18/121,837

(22) Filed: Mar. 15, 2023

(65) Prior Publication Data

US 2023/0298386 A1      Sep. 21, 2023

(30) Foreign Application Priority Data

Mar. 18, 2022    (JP) ................................. 2022-044418
Feb. 7, 2023    (JP) ................................. 2023-016876

(51) Int. Cl.
*G06V 40/60*        (2022.01)
*G06T 7/70*        (2017.01)
*G06V 40/16*        (2022.01)

(52) U.S. Cl.
CPC ................ *G06V 40/67* (2022.01); *G06T 7/70* (2017.01); *G06V 40/166* (2022.01); *G06V 40/172* (2022.01); *G06T 2207/30201* (2013.01)

(58) Field of Classification Search
CPC .... G06V 40/67; G06V 40/172; G06V 40/166; G06T 7/70; G06T 2207/30201
See application file for complete search history.

(56) References Cited

U.S. PATENT DOCUMENTS

| | | | |
|---|---|---|---|
| 2014/0219519 A1 | 8/2014 | Yuasa | |
| 2015/0205999 A1 | 7/2015 | Yuasa | |
| 2018/0247112 A1 | 8/2018 | Norimatsu | |
| 2018/0285628 A1* | 10/2018 | Son ........................ G06V 40/45 |
| 2019/0028659 A1* | 1/2019 | Kawata ................ H04N 23/611 |
| 2019/0180088 A1 | 6/2019 | Norimatsu | |
| 2020/0285843 A1 | 9/2020 | Norimatsu | |
| 2021/0374220 A1* | 12/2021 | Ichikawa ................. G07C 9/27 |
| 2022/0172509 A1* | 6/2022 | Rodriguez ........... H04N 23/611 |
| 2022/0309829 A1* | 9/2022 | Umeda ................... G06V 40/50 |

FOREIGN PATENT DOCUMENTS

| | | |
|---|---|---|
| JP | 2004-151978 A | 5/2004 |
| JP | 2014-153817 A | 8/2014 |
| JP | 2020-170569 A | 10/2020 |

* cited by examiner

*Primary Examiner* — Syed Haider
(74) *Attorney, Agent, or Firm* — Rimon P.C.

(57) ABSTRACT

In an authentication apparatus, a camera captures an image including a face image that is an image of a face of an imaging target person, a touch screen displays the face image, a display control unit causes the touch screen to display a guide frame for guiding the imaging target person to an imaging position of the face based on a display position of the face image in the touch screen, and a personal authentication unit performs personal authentication using the face image when the face image is located within the guide frame.

11 Claims, 11 Drawing Sheets

1

AUTHENTICATION APPARATUS, AUTHENTICATION METHOD, AND RECORDING MEDIUM

CROSS-REFERENCE TO RELATED APPLICATIONS

The present application claims priority to and incorporates by reference the entire contents of Japanese Patent Application No. 2022-044418, filed on Mar. 18, 2022 and Japanese Patent Application No. 2023-016876, filed on Feb. 7, 2023.

FIELD

The present disclosure relates to an authentication apparatus, a authentication method, and a recording medium.

BACKGROUND

An authentication apparatus that performs personal authentication by using an image (hereinafter, may be referred to as a "face image") of a face of an individual is known. The authentication apparatus performs personal authentication by, for example, checking whether a face image that is registered in an integrated circuit (IC) card matches a face image that is captured by a camera included in the authentication apparatus. The authentication apparatus may adopt an unspecified number of individuals with various heights as authentication targets, and therefore a camera (hereinafter, may be referred to as a "wide-angle camera") with a wide-angle lens is mounted on the authentication apparatus.

In the wide-angle camera, distortion increases in a peripheral area of a field of view. Therefore, an authentication apparatus that displays, in a display unit included in the authentication apparatus, a guide frame (hereinafter, may be referred to as a "face guide frame") for guiding an imaging target person to a face imaging position, together with a face image that is captured by the wide-angle camera is known. By allowing the imaging target person to adjust a position of the face such that the face image fits in the face guide frame, it is possible to prevent reduction in an authentication rate of the personal authentication.

Examples of related-art are described in Japanese Laid-open Patent Publication No. 2004-151978, Japanese Laid-open Patent Publication No. 2014-153817, and Japanese Laid-open Patent Publication No. 2020-170569.

As described above, the authentication apparatus adopts an unspecified number of individuals with various heights as authentication targets, so that it is inconvenient if a display position of the face guide frame is fixed in the display unit. In particular, it is difficult for a short person to stand on tiptoes for performing adjustment such that the face image is located within the face guide frame.

In view of the foregoing situation, the present disclosure provides a technology for allowing the imaging target person to smoothly perform personal authentication even when the imaging target person has any height.

SUMMARY

According to an aspect of an embodiment, an authentication apparatus includes a camera, a display, and a processor. The camera acquires an image including a face of a person. The display displays the image including the face. The processor identifies a position of the face in the image. The processor, based on the identified position of the face in the image, displays a guide frame on the display within the image, the guide frame being for guiding the person to move his/her face so that the face in the image is located within the guide frame. And, the processor, in response to determining that the face in the image is located within the guide frame, performs personal authentication using the face within the guide frame.

DESCRIPTION OF EMBODIMENTS

Figure 1:
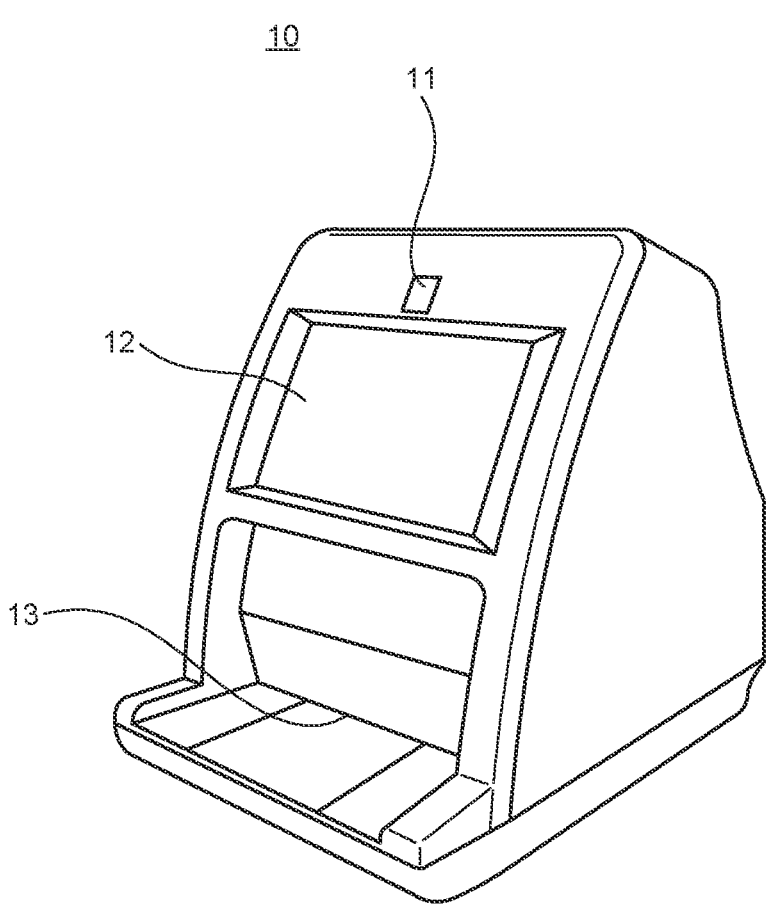
FIG. 1 is a diagram illustrating an example of an external appearance of an authentication apparatus of a first embodiment of the present disclosure.

Embodiments of the present disclosure will be described below based on the drawings. In the drawings, the same components are denoted by the same reference symbols.

[a] First Embodiment

<External Appearance of Authentication Apparatus>

FIG. 1 is a diagram illustrating an example of an external appearance of an authentication apparatus of a first embodiment of the present disclosure. In FIG. 1, an authentication apparatus 10 includes a camera 11, a touch screen 12, an integrated circuit (IC) card slot 13, and an IC card reading unit 14. A face image of an owner of an IC card that is inserted in the IC card slot 13 is registered in the IC card. The authentication apparatus 10 performs personal authentication on an imaging target person of the camera 11 by checking whether the face image that is registered in the IC card inserted in the IC card slot 13 matches a face image that is captured by the camera 11.

<Installation of Authentication Apparatus>

Figure 2:
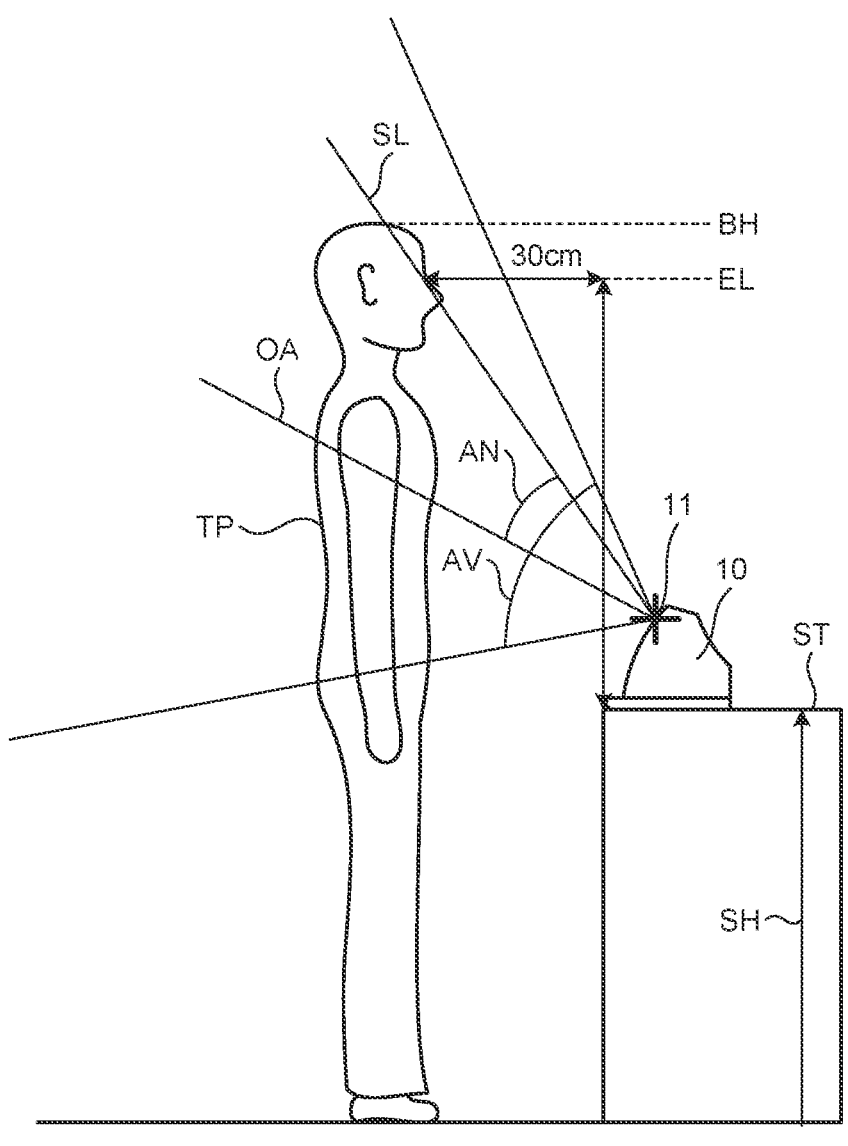
FIG. 2 is a diagram illustrating an installation example of the authentication apparatus of the first embodiment of the present disclosure.

FIG. 2 is a diagram illustrating an installation example of the authentication apparatus of the first embodiment of the present disclosure. As illustrated in FIG. 2, the authentication apparatus 10 is installed on a table ST with a certain height SH. The camera 11 included in the authentication apparatus 10 is a wide-angle camera with an angle of view AV of equal to or larger than 85 degrees and equal to or smaller than 105 degrees in a vertical direction. For example, when the camera 11 has a predetermined angle of view equal to or larger than 85 degrees and equal to or smaller than 105 degrees in the vertical direction and the authentication apparatus 10 is installed for an imaging target person TP with a height BH of 155 centimeters (cm), the authentication apparatus 10 is installed on the table ST with the height SH of 70 cm. Further, an eye level EL of the imaging target person TP with the height BH of 155 cm is generally about 145 cm, and the imaging target person TP is normally captured by the camera 11 while standing at a position separated from the authentication apparatus 10 by about 30 cm. Therefore, it is preferable that an orientation of the camera 11 in the vertical direction is adjusted to a certain orientation such that when the authentication apparatus 10 is installed on the table ST with the height SH of 70 cm, an angle AN formed between a straight line SL connecting the camera 11 and positions of the eyes of the imaging target person TP and an optical axis OA of the camera 11 is about 28 degrees.

<Configuration of Authentication Apparatus>

Figure 3:
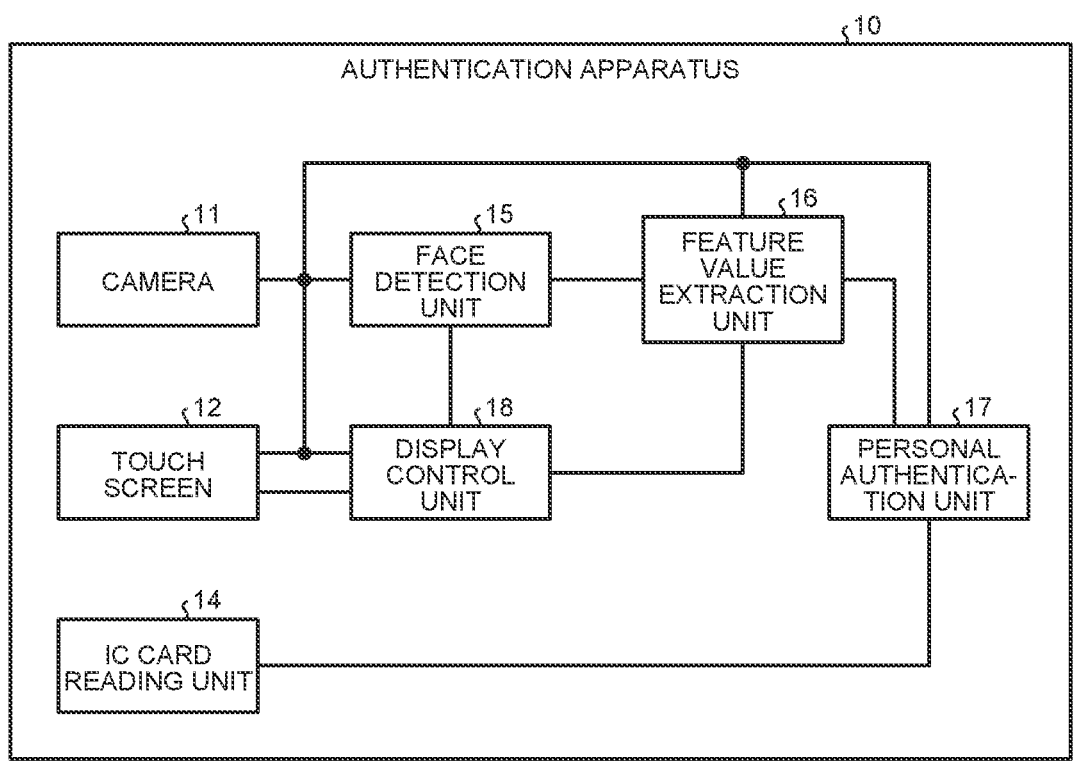
FIG. 3 is a diagram illustrating a configuration example of the authentication apparatus of the first embodiment of the present disclosure.

FIG. 3 is a diagram illustrating a configuration example of the authentication apparatus of the first embodiment of the present disclosure. In FIG. 3, the authentication apparatus 10 includes the camera 11, the touch screen 12, the IC card reading unit 14, a face detection unit 15, a feature value extraction unit 16, a personal authentication unit 17, and a display control unit 18. When the IC card is inserted in the IC card slot 13, the camera 11 with a predetermined angle of view performs image capturing at a predetermined frame rate, and captures an image that includes an image of an imaging target person (hereinafter, may be referred to as a "target person image") who faces the authentication apparatus 10. In the following, the image that is captured by the camera 11 may be referred to as a "camera image". The camera image is output from the camera 11 to the touch screen 12, the face detection unit 15, the feature value extraction unit 16, the personal authentication unit 17, and the display control unit 18. The camera image is displayed on the touch screen 12. The IC card reading unit 14 reads, from the IC card, a face image (hereinafter may be referred to as a "registered face image") that is registered in the IC card inserted in the IC card slot 13. The touch screen 12 is one example of a display unit that displays the face image. Examples of the display unit that displays the face image include a liquid crystal display, in addition to the touch screen 12. The face detection unit 15, the feature value extraction unit 16, the personal authentication unit 17, and the display control unit 18 are implemented as hardware by, for example, a processor, such as a central processing unit (the CPU), a digital signal processor (DSP), a field programmable gate array (FPGA), or an application specific integrated circuit (ASIC). The IC card reading unit 14 is implemented as hardware by, for example, an IC card reader.

<Flow of Process Performed by Authentication Apparatus>

Figure 4:
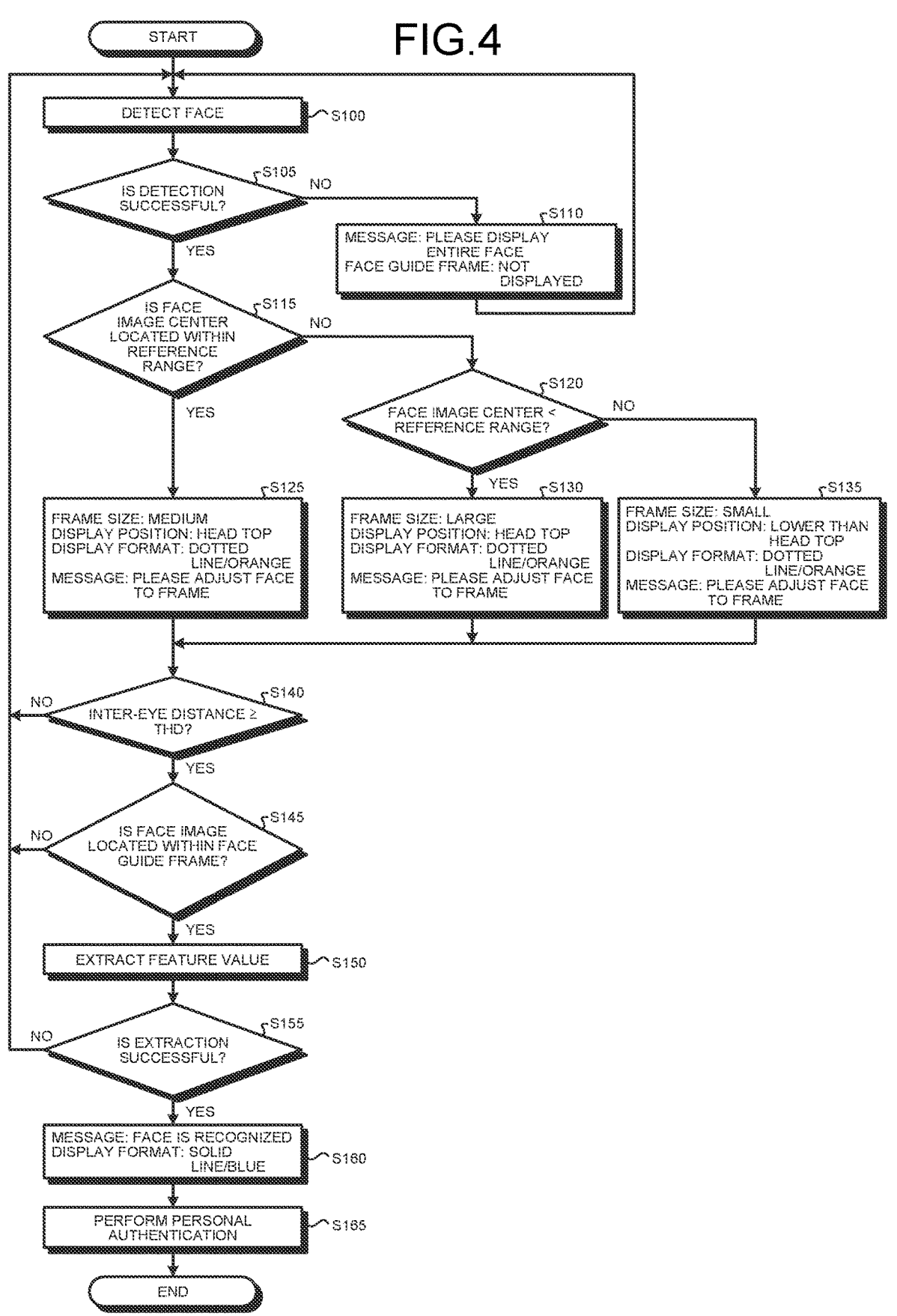
FIG. 4 is a flowchart illustrating an example of the flow of a process performed by the authentication apparatus of the first embodiment of the present disclosure.

FIG. 4 is a flowchart illustrating an example of the flow of a process performed by the authentication apparatus of the first embodiment of the present disclosure. FIG. 5 to FIG. 9 are diagrams illustrating display examples of the touch screen of the first embodiment of the present disclosure.

At Step S100, the face detection unit 15 attempts to detect a face in a camera image CI.

Figure 5:
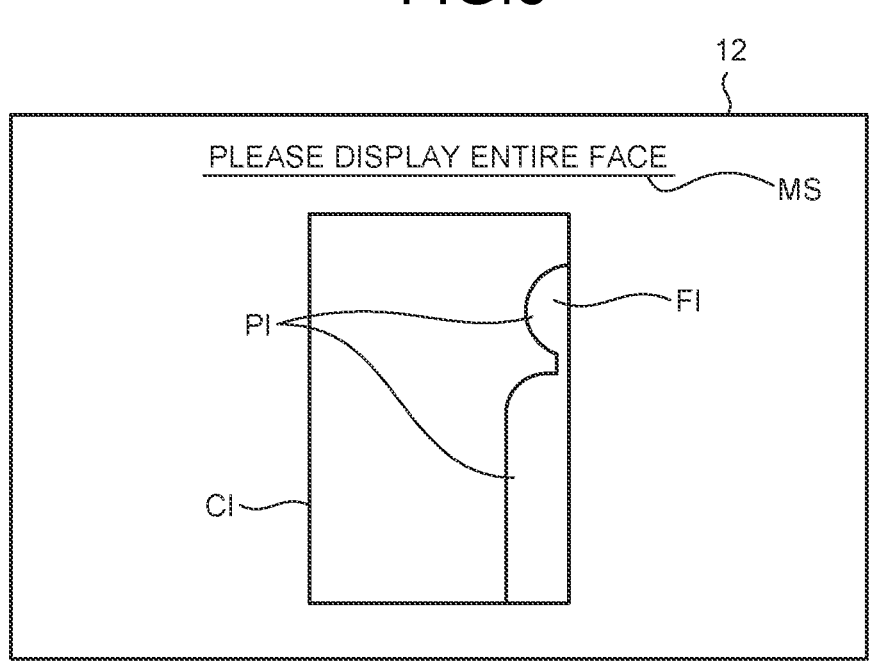
FIG. 5 is a diagram illustrating a display example of a touch screen of the first embodiment of the present disclosure.

Subsequently, at Step S105, the face detection unit 15 determines whether detection of the face attempted at Step S100 is successful. As illustrated in FIG. 5, the camera image CI displayed on the touch screen 12 includes a target person image PI. Further, the target person image PI includes a face image FI. The face detection unit 15 determines that the detection of the face in the camera image CI is unsuccessful when the camera image CI includes only a part of the face image FI, and determines that the detection of the face in the camera image CI is successful when the camera image CI includes the entire face image FI. When the detection of the face in the camera image CI is unsuccessful (Step S105: No), the process goes to Step S110, and when the detection of the face in the camera image CI is successful (Step S105: Yes), the process goes to Step S115.

At Step S110, the display control unit 18 displays, as illustrated in FIG. 5, a message of "please display entire face" in a message display field MS that is set in the touch screen 12. Further, at Step S110, the display control unit 18 does not cause the touch screen 12 to display the face guide frame. After execution of the process at Step S110, the process returns to Step S100.

In contrast, at Step S115, the display control unit 18 detects a position of an area center CE (hereinafter, may be referred to as a "face image center") of the face image FI in the camera image CI, as a display position of the face image FI in the camera image CI. Then, the display control unit 18 determines whether the face image center CE is located within a reference range CR in a vertical direction of the camera image CI. It is preferable that the reference range CR is set in the vicinity of a position at which distortion is minimized, in other words, in the vicinity of the center of the angle of view AV, in the camera image CI that is captured by the camera 11 as the wide-angle camera. When the face image center CE is not located within the reference range CR (Step S115: No), the process goes to Step S120, and when the face image center CE is located within the reference range CR (Step S115: Yes), the process goes to Step S125.

At Step S120, the display control unit 18 determines whether the face image center CE is located at a position below the reference range CR. When the face image center CE is located at a position below the reference range CR (Step S120: Yes), the process goes to Step S130, and when the face image center CE is located at a position above the reference range CR (Step S120: No), the process goes to Step S135.

Figure 6:
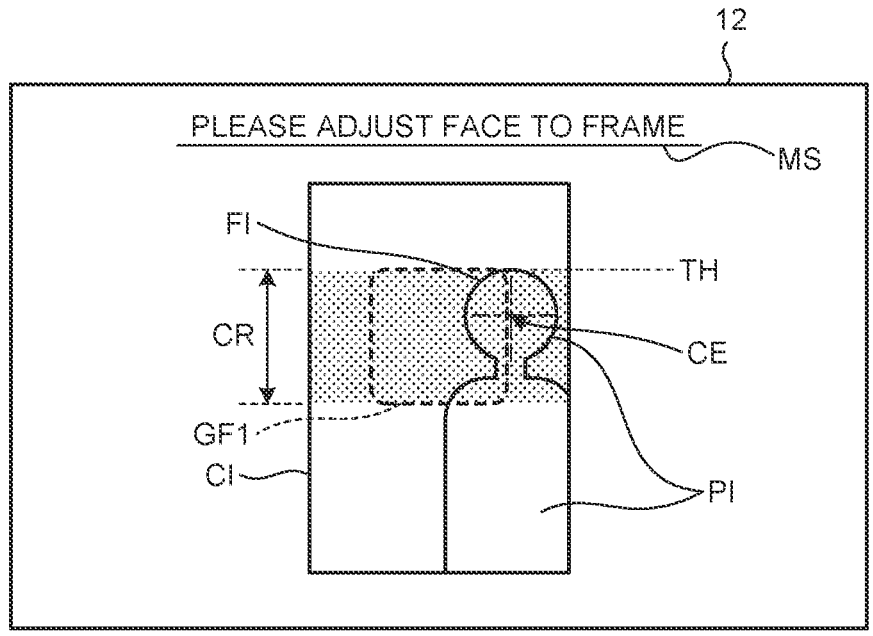
FIG. 6 is a diagram illustrating a display example of the touch screen of the first embodiment of the present disclosure.

At Step S125, as illustrated in FIG. 6, the face image center CE is located within the reference range CR, and therefore, the display control unit 18 causes the touch screen 12 to display a face guide frame GF1 that has a medium size, that is indicated by a dotted line, and that is colored in orange, for example. Four sides of the face guide frame GF1 have the same lengths. Further, at Step S125, as illustrated in FIG. 6, the display control unit 18 causes the touch screen 12 to display the face guide frame GF1 such that an upper side of the face guide frame GF1 coincides with a head top TH of the face image FI in a vertical direction of the camera image CI. Furthermore, the display control unit 18 causes the touch screen 12 to display the face guide frame GF1 such that a center of the face guide frame GF1 coincides with a center of the camera image CI in a lateral direction of the camera image CI. Moreover, at Step S125, as illustrated in FIG. 6, the display control unit 18 displays a message of "please adjust face to frame" in the message display field MS.

Figure 7:
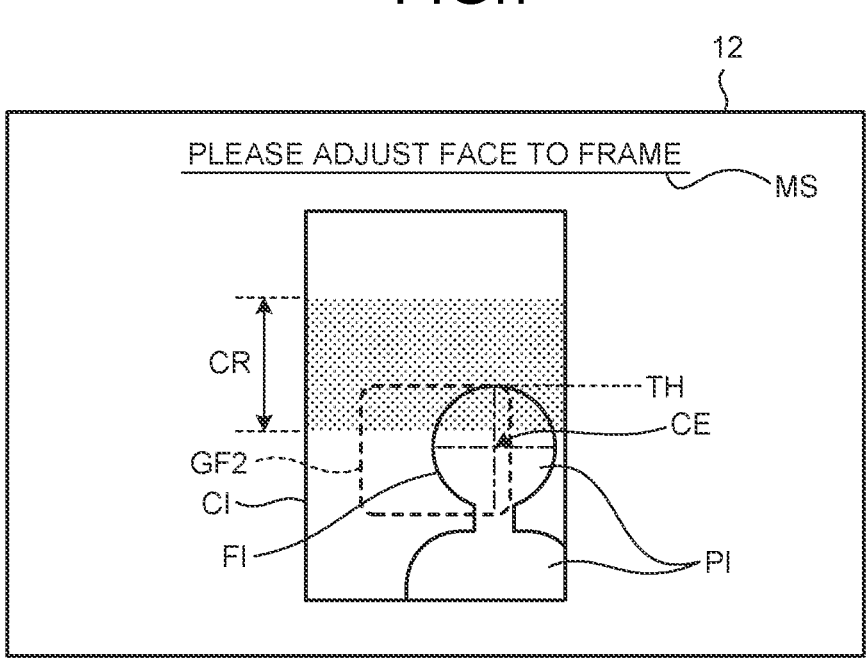
FIG. 7 is a diagram illustrating a display example of the touch screen of the first embodiment of the present disclosure.

At Step S130, as illustrated in FIG. 7, the face image center CE is located at a position below the reference range CR, so that the display control unit 18 causes the touch screen 12 to display a face guide frame GF2 that has a large size, that is indicated by a dotted line, and that is colored in orange, for example. Four sides of the face guide frame GF2 have the same lengths. Further, at Step S130, as illustrated in FIG. 7, the display control unit 18 causes the touch screen 12 to display the face guide frame GF2 such that an upper side of the face guide frame GF2 coincides with the head top TH of the face image FI in the vertical direction of the camera image CI. Furthermore, the display control unit 18 causes the touch screen 12 to display the face guide frame GF2 such that a center of the face guide frame GF2 coincides with the center of the camera image CI in the lateral direction of the camera image CI. Moreover, at Step S130, as illustrated in FIG. 7, the display control unit 18 displays a message of "please adjust face to frame" in the message display field MS.

Figure 8:
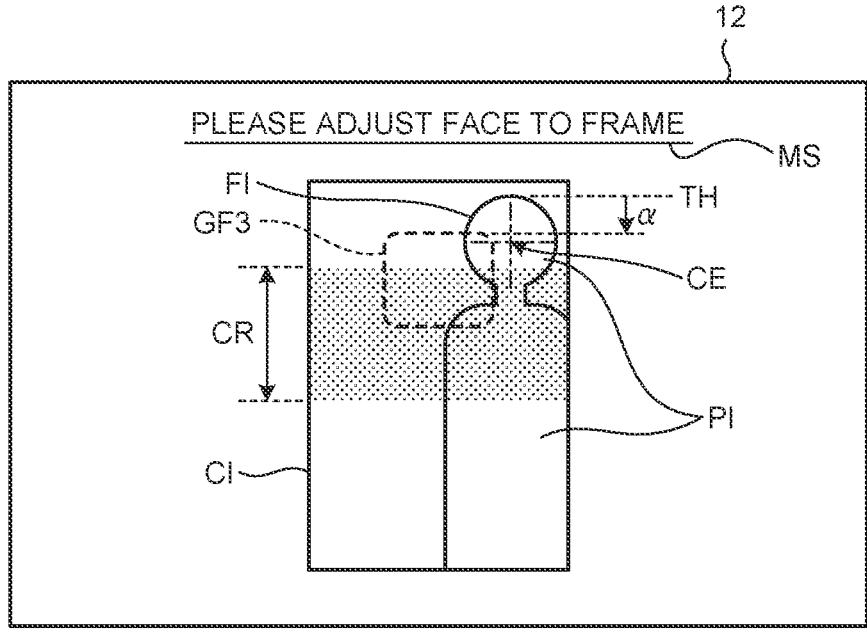
FIG. 8 is a diagram illustrating a display example of the touch screen of the first embodiment of the present disclosure.

At Step S135, as illustrated in FIG. 8, the face image center CE is located at a position above the reference range CR, so that the display control unit 18 causes the touch screen 12 to display a face guide frame GF3 that has a small size, that is indicated by a dotted line, and that is colored in orange, for example. Four sides of the face guide frame GF3 have the same lengths. Further, at Step S135, as illustrated in FIG. 8, the display control unit 18 causes the touch screen 12 to display the face guide frame GF3 such that an upper side of the face guide frame GF3 coincides with a position that is lower than the head top TH of the face image FI by a predetermined amount a in the vertical direction of the camera image CI. Furthermore, the display control unit 18 causes the touch screen 12 to display the face guide frame GF3 such that a center of the face guide frame GF3 coincides with the center of the camera image CI in the lateral direction of the camera image CI. Moreover, at Step S135, as illustrated in FIG. 8, the display control unit 18 displays a message of "please adjust face to frame" in the message display field MS.

After execution of the process at Step S125, S130, or S135, the process goes to Step S140. In the following, the face guide frames GF1, GF2, and GF3 may be collectively referred to as a "face guide frame GF".

Here, the display position of the face image FI illustrated in FIG. 6 is higher than the display position of the face image FI illustrated in FIG. 7, and the display position of the face image FI illustrated in FIG. 8 is higher than the display position of the face image FI illustrated in FIG. 6. Further, the size of the face guide frame GF1 is smaller than the size of the face guide frame GF2, and the size of the face guide frame GF3 is smaller than the size of the face guide frame GF1. In other words, the display control unit 18 causes the touch screen 12 to display the guide frame GF that has a smaller size at a higher display position of the face image FI in the camera image CI.

At Step S140, the face detection unit 15 detects positions of both eyes in the face image FI, and determines whether a distance between the both eyes (hereinafter, may be referred to as an "inter-eye distance") is equal to or larger than a threshold THD. When the inter-eye distance is equal to or larger than the threshold THD (Step S140: Yes), the process goes to Step S145, and when the inter-eye distance is smaller than the threshold THD (Step S140: No), the process returns to Step S100.

At Step S145, the face detection unit 15 determines whether the face image FI is located within the face guide frame GF. When the face image FI is located within the face guide frame GF (Step S145: Yes), the process goes to Step S150, and when the face image FI is not located within the face guide frame GF (Step S145: No), the process returns to Step S100.

At Step S150, the feature value extraction unit 16 attempts to extract a feature value of the face image FI from the face image FI.

Subsequently, at Step S155, the feature value extraction unit 16 determines whether extraction of the feature value of the face image FI is successful. When the extraction of the feature value of the face image FI is successful (Step S155: Yes), the process goes to Step S160, and when the extraction of the feature value of the face image FI is unsuccessful (Step S155: No), the process returns to Step S100.

Figure 9:
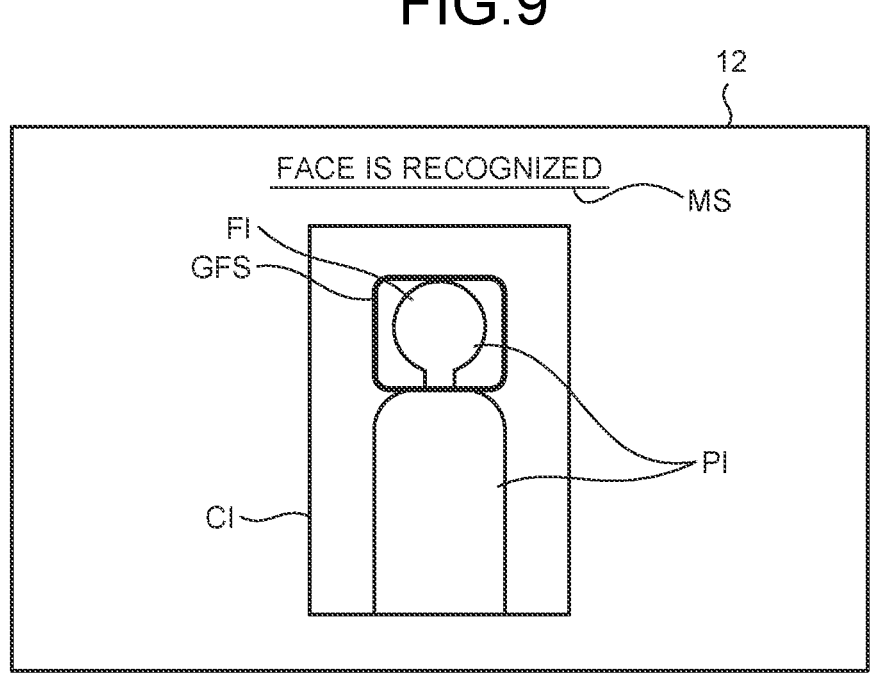
FIG. 9 is a diagram illustrating a display example of the touch screen of the first embodiment of the present disclosure.

Subsequently, at Step S160, as illustrated in FIG. 9, the display control unit 18 causes the touch screen 12 to display a face guide frame GFS that is indicated by a solid line and that is colored in blue for example, and to display a message of "face is recognized" in the message display field MS. When the process at Step S160 is performed after execution of the process at Step S125, the size and the position of the face guide frame GFS are the same as the size and the position of the face guide frame GF1. Further, when the process at Step S160 is performed after execution of the process at Step S130, the size and the position of the face guide frame GFS are the same as the size and the position of the face guide frame GF2. Furthermore, when the process at Step S160 is performed after execution of the process at Step S135, the size and the position of the face guide frame GFS are the same as the size and the position of the face guide frame GF3.

Subsequently, at Step S165, the personal authentication unit 17 extracts a feature value of the registered face image from the registered face image, compares the feature value of the registered face image with the feature value of the face image FI that has been extracted at Step S150, and performs personal authentication on the imaging target person by checking whether the registered face image matches the face image FI in the camera image.

Thus, the first embodiment has been described above.

[b] Second Embodiment

<Operation of Authentication Apparatus and Display of Touch Screen>

Figure 10:
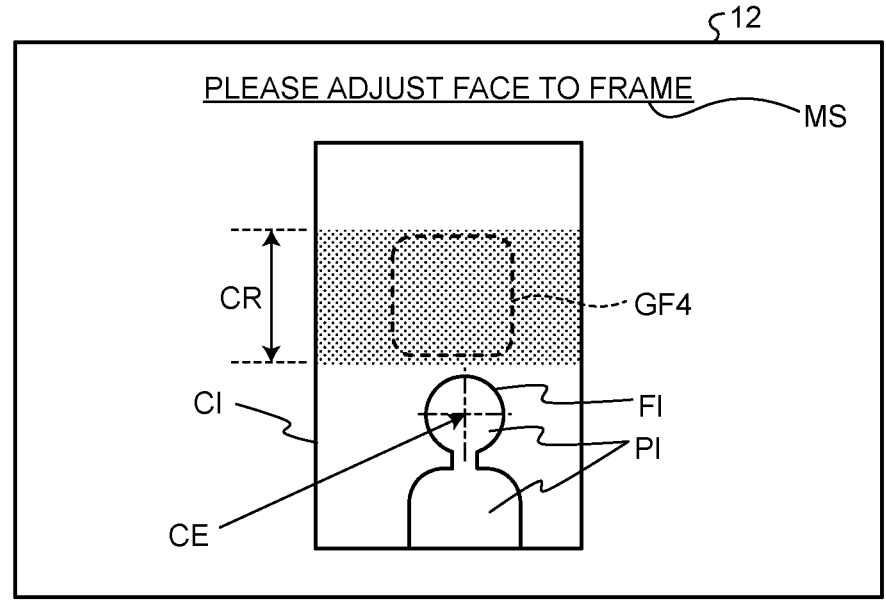
FIG. 10 is a diagram illustrating a display example of a touch screen of a second embodiment of the present disclosure.

FIG. 10 is a diagram illustrating a display example of a touch screen of a second embodiment of the present disclosure.

The display control unit 18 determines whether the face image center CE is located at a position below the reference range CR. FIG. 10 illustrates a case in which the face image center CE is located at a position below the reference range CR as one example. When the face image center CE is located at a position below the reference range CR, the face detection unit 15 detects positions of both eyes in the face image FI, and determines whether the inter-eye distance is smaller than a threshold THI (however, the threshold THI<the threshold THD). Then, when the face image center CE is located at a position below the reference range CR and the inter-eye distance is smaller than the threshold THI, the display control unit 18 determines that an imaging target person is standing at a position separated from the authentication apparatus 10 by a predetermined distance or more, and when displaying a face guide frame GF4 that has a middle size, that is indicated by a dotted line, and that is colored in orange on the touch screen 12, displays the guide frame GF4 at a predetermined position in the reference range CR. As illustrated in FIG. 10, the predetermined position at which the guide frame GF4 is displayed is, for example, the center of the reference range CR. Four sides of the face guide frame GF4 have the same lengths. Further, as illustrated in FIG. 10, the display control unit 18 displays a message of "please adjust face to frame" in the message display field MS, in addition to displaying the guide frame GF4 at the predetermined position in the reference range CR.

Here, when the face guide frame GF is displayed on the touch screen 12 such that the upper side of the guide frame GF coincides with the head top TH of the face image FI as in the first embodiment, the face guide frame GF is displayed in a lower part of the touch screen 12 when the imaging target person is standing at a position separated from the authentication apparatus 10. Therefore, the imaging target person needs to stoop down to fit the face image FI in the face guide frame GF when performing personal authentication while approaching the authentication apparatus 10.

In contrast, as described above, when the imaging target person is standing at a position separated from the authentication apparatus 10, and when the guide frame GF4 is displayed at the predetermined position in the reference range CR, it is possible to display the face guide frame GF in a slightly upper part relative to the center of the touch screen 12, so that the imaging target person need not to stoop down when performing personal authentication while approaching the authentication apparatus 10. Therefore, it is possible to improve usability of the authentication apparatus 10.

Meanwhile, the second embodiment may be implemented by combination with the first embodiment. When the second embodiment is implemented by combination with the first embodiment, and when the face image center CE is not located at a position below the reference range CR, the display control unit 18 displays the face guide frame GF at a certain position in accordance with the first embodiment.

Thus, the second embodiment has been described above.

[c] Third Embodiment

<Operation of Authentication Apparatus and Display of Touch Screen>

Figure 11:
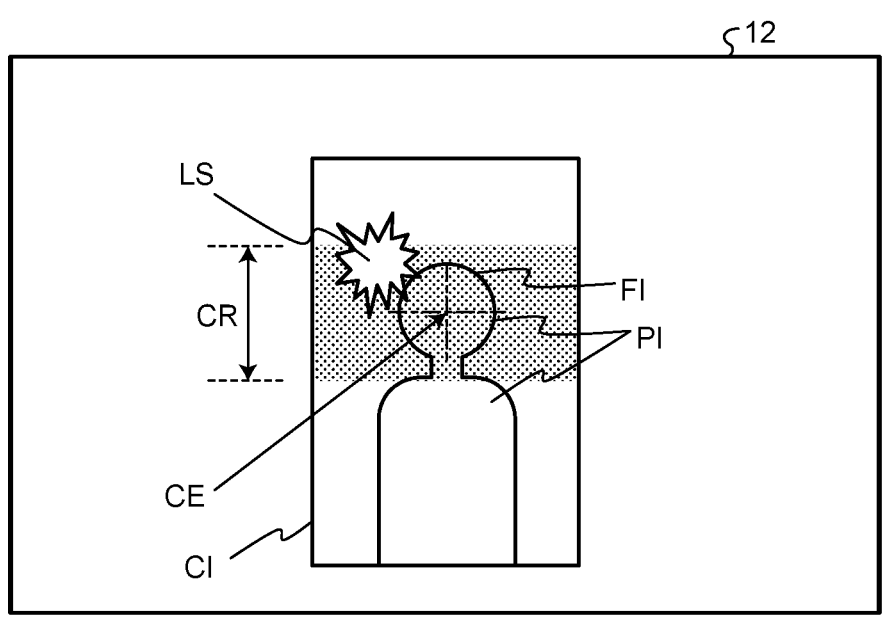
FIG. 11 is a diagram illustrating an operation example of an authentication apparatus of a third embodiment of the present disclosure.
Figure 12:
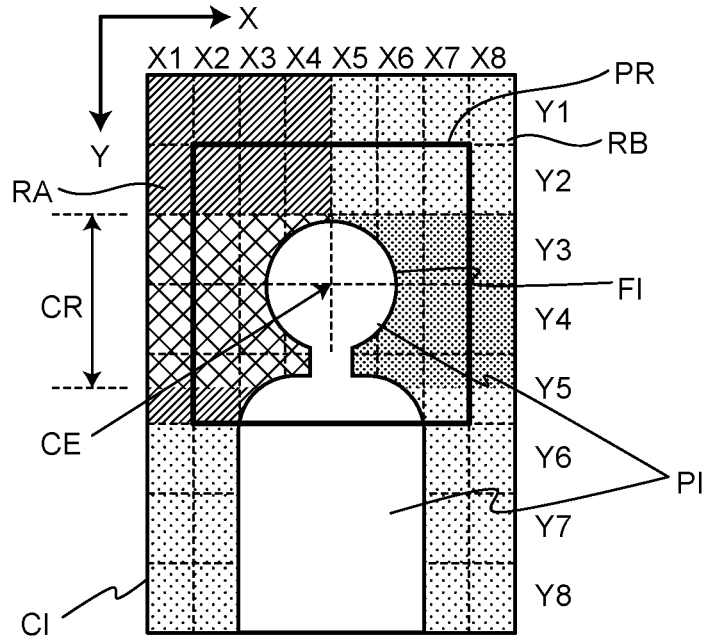
FIG. 12 is a diagram illustrating an operation example of the authentication apparatus of the third embodiment of the present disclosure.
Figure 13:
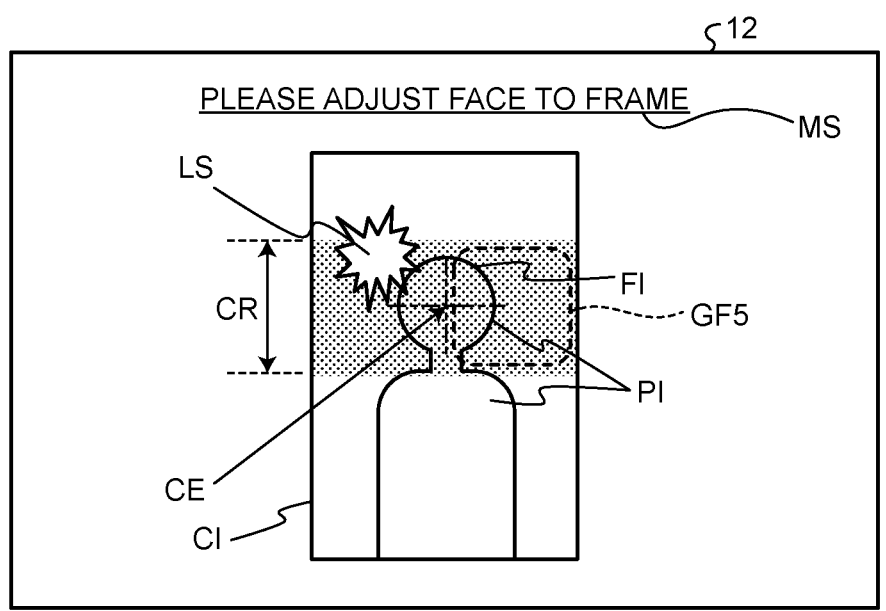
FIG. 13 is a diagram illustrating a display example of a touch screen of the third embodiment of the present disclosure.

FIG. 11 and FIG. 12 are diagrams illustrating an operation example of an authentication apparatus of a third embodiment of the present disclosure. FIG. 13 is a diagram illustrating a display example of a touch screen of the third embodiment of the present disclosure.

As illustrated in FIG. 11, when the face of the imaging target person is located near a light source LS that appears in the camera image CI, blown out highlights may occur in an image (hereinafter, may be referred to as a peripheral image) in the vicinity of the face image FI, so that accuracy of personal authentication may be reduced.

To cope with this, when the face image center CE is located in the reference range CR, as illustrated in FIG. 12, the display control unit 18 divides the camera image CI into 64 rectangular regions (X1,Y1) to (X8,Y8) by dividing a side in the X direction by eight and dividing a side in the Y direction by eight, and calculates an average value (hereinafter, may be referred to as an "region luminance average") of luminance of a plurality of pixels included in each of the regions, for each of the regions (X1,Y1) to (X8,Y8). Further, the display control unit 18 determines whether the region luminance average of each of the regions (X1,Y1) to (X8, Y8) is equal to or larger than a threshold THB. As one example, FIG. 12 illustrates a case in which it is determined that, in the camera image CI, the region luminance average of each of the regions (X1,Y1), (X2,Y1), (X3,Y1), (X4,Y1), (X1,Y2), (X2, Y2), (X3, Y2), (X4, Y2), (X1, Y3), (X2, Y3), (X3, Y3), (X4,Y3), (X1,Y4), (X2,Y4), (X3,Y4), (X4,Y4), (X1,Y5), (X2,Y5), (X3,Y5), and (X4,Y5) (hereinafter, the regions may collectively be referred to as a "region RA") is equal to or larger than the threshold THB, and the region luminance average of each of regions (hereinafter, the regions may collectively be referred to as n "region RB") other than the region RA is smaller than the threshold THB.

Furthermore, the display control unit 18 identifies a region that is located within a predetermined distance from the face image center CE among the 64 rectangular regions in the camera image CI, as a region PR (hereinafter, may be referred to as a "peripheral image region") that forms a peripheral image. For example, in the example illustrated in FIG. 12, the display control unit 18 identifies the regions (X2,Y2), (X3,Y2), (X4,Y2), (X5,Y2), (X6,Y2), (X7,Y2), (X2,Y3), (X3,Y3), (X4,Y3), (X5, Y3), (X6, Y3), (X7, Y3), (X2, Y4), (X3, Y4), (X4, Y4), (X5,Y4), (X6,Y4), (X7,Y4), (X2,Y5), (X3,Y5), (X4,Y5), (X5,Y5), (X6,Y5), and (X7, Y5) as the peripheral image regions PR among the 64 rectangular regions in the camera image CI. Moreover, the regions in which the region luminance averages are equal to or larger than the threshold THB among the peripheral image regions PR are the regions (X2,Y2), (X3,Y2), (X4, Y2), (X2,Y3), (X3,Y3), (X4,Y3), (X2,Y4), (X3,Y4), (X4, Y4), (X2,Y5), (X3,Y5), and (X4,Y5).

Furthermore, in the regions RB illustrated in FIG. 12, whole areas of the regions (X5,Y3), (X6,Y3), (X7,Y3), (X8,Y3), (X5,Y4), (X6,Y4), (X7,Y4), and (X8,Y4) and upper partial areas of the regions (X5,Y5), (X6,Y5), (X7, Y5), and (X8,Y5) overlap with the reference range CR. In the following, a region in which the region RB and the reference range CR overlap with each other may be referred to as a "low-luminance overlapping region".

Therefore, as illustrated in FIG. 13, when displaying a face guide frame GF5 that has a medium size, that is indicated by a dotted line, and that is colored in orange in the touch screen 12 for example, the display control unit 18 displays the guide frame GF5 in the low-luminance overlapping region. Furthermore, as illustrated in FIG. 13, the display control unit 18 displays the guide frame GF5 in the low-luminance overlapping region and displays a message of "please adjust face to frame" in the message display field MS.

As described above, when the luminance of the peripheral image of the face image FI is equal to or larger than the threshold THB, the guide frame GF5 is displayed at a position at which the luminance is smaller than the threshold THB in the reference range CR, so that it is possible to guide the imaging target person to move the face at a position separated from the light source LS and it is possible to prevent generation of blown out highlights in the peripheral image. Therefore, it is possible to prevent reduction in accuracy of personal authentication.

Meanwhile, the third embodiment may be implemented by combination with the first embodiment or the second embodiment. When the third embodiment is implemented by combination with the first embodiment or the second embodiment, and when the region luminance averages of all of the regions are smaller than the threshold THB, the display control unit 18 displays the face guide frame GF at a certain position in accordance with the first embodiment.

Thus, the third embodiment has been described above.

[d] Fourth Embodiment

<Operation of Authentication Apparatus and Display of Touch Screen>

Figure 14:
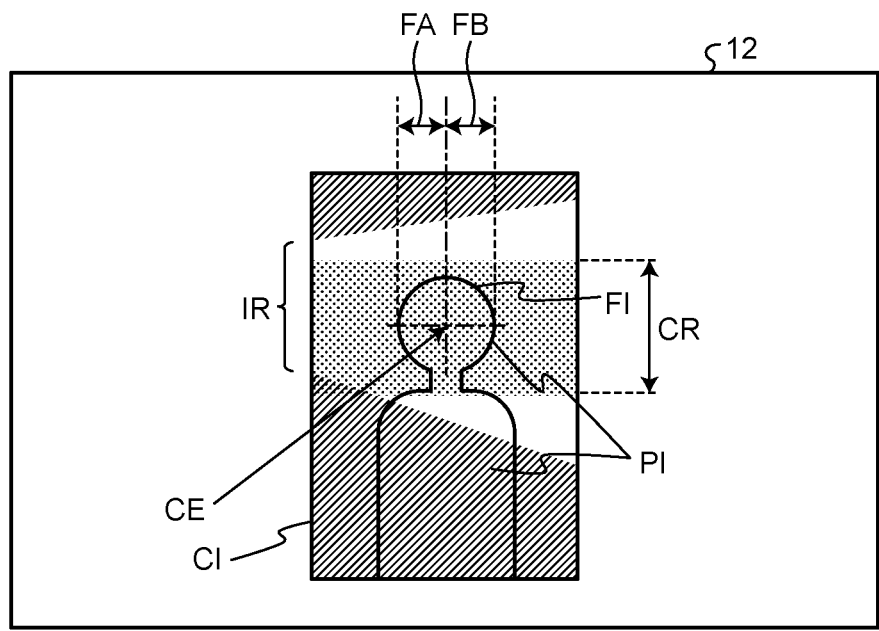
FIG. 14 is a diagram illustrating an operation example of an authentication apparatus of a fourth embodiment of the present disclosure.
Figure 15:
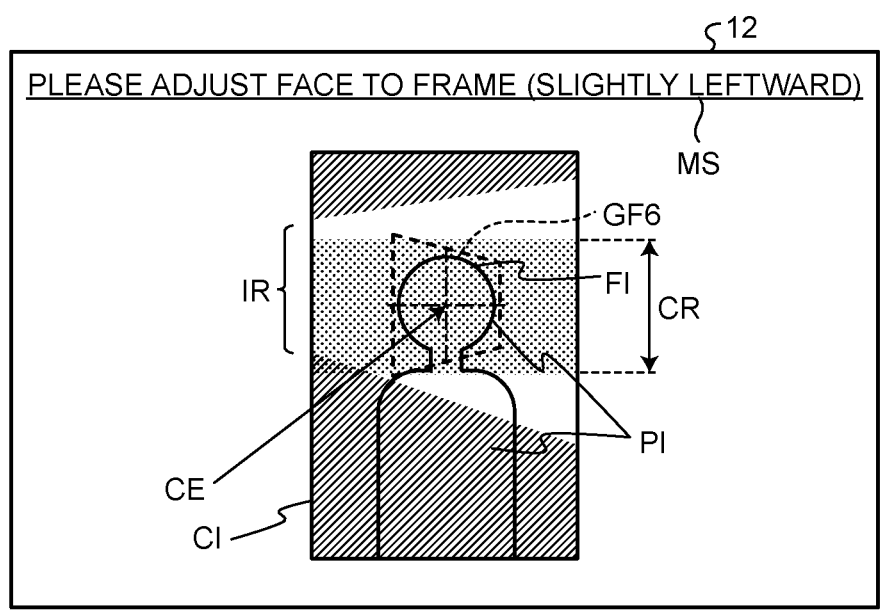
FIG. 15 is a diagram illustrating a display example of a touch screen of the fourth embodiment of the present disclosure.
Figure 16:
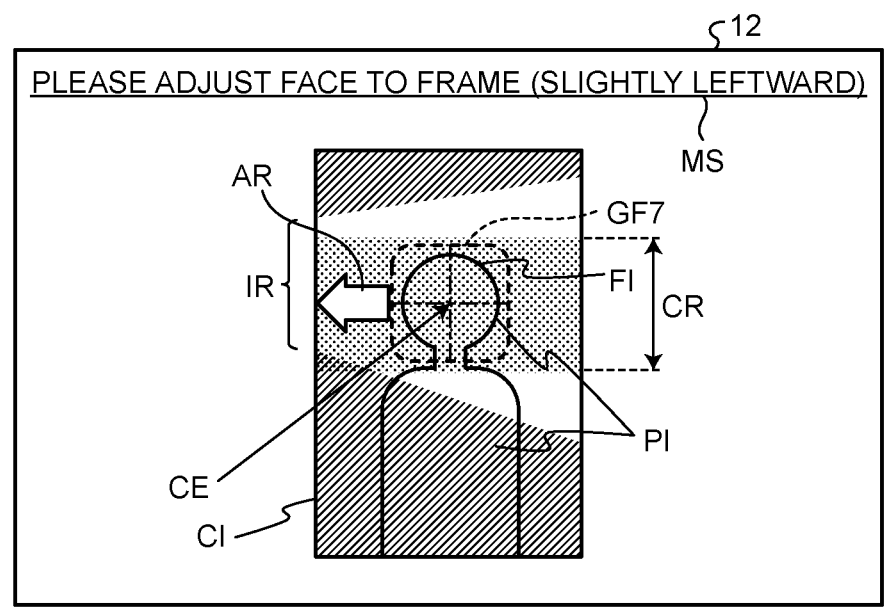
FIG. 16 is a diagram illustrating a display example of the touch screen of the fourth embodiment of the present disclosure.
Figure 17:
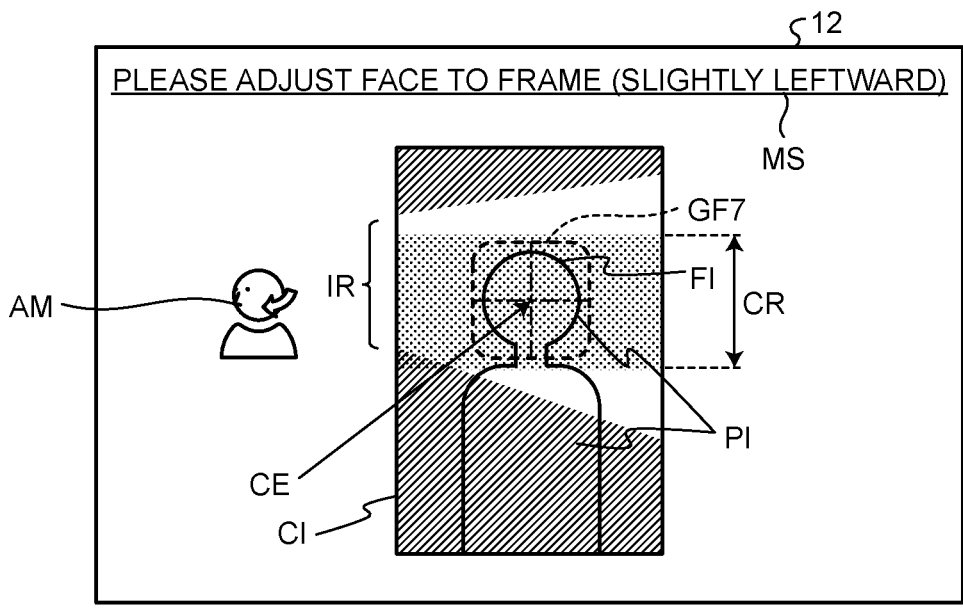
FIG. 17 is a diagram illustrating a display example of the touch screen of the fourth embodiment of the present disclosure.

FIG. 14 is a diagram illustrating an operation example of an authentication apparatus of a fourth embodiment of the present disclosure. FIG. 15, FIG. 16, and FIG. 17 are diagrams illustrating display examples of a touch screen of the fourth embodiment of the present disclosure.

As illustrated in FIG. 14, when side light IR is input from a left side of the camera 11 that faces the imaging target person, a left half (hereinafter, may be referred to as a "left half image") FA of the face image FI becomes brighter, and a right half (hereinafter, may be referred to as a "right half image") FB of the face image FI becomes darker, so that a luminance difference occurs between the left half image FA and the right half image FB and accuracy of personal authentication may be reduced.

Therefore, similarly to the third embodiment, as illustrated in FIG. 12, when the face image center CE is located in the reference range CR, the display control unit 18 first divides the camera image CI into 64 rectangular regions (X1,Y1) to (X8,Y8) by dividing a side in the X direction by eight and dividing a side in the Y direction by eight.

Furthermore, the display control unit 18 identifies a region (hereinafter, may be referred to as a face image overlapping region") that overlaps with the face image FI among the 64 rectangular regions (FIG. 12) in the camera image CI. For example, in the example illustrated in FIG. 12, the display control unit 18 identifies the regions (X3,Y3), (X4,Y3), (X5,Y3), (X6,Y3), (X3,Y4), (X4,Y4), (X5,Y4), and (X6,Y4) as the face image overlapping regions among the 64 rectangular regions in the camera image CI.

Moreover, the display control unit 18 classifies the face image overlapping regions (X3,Y3), (X4, Y3), (X5, Y3), (X6, Y3), (X3, Y4), (X4, Y4), (X5, Y4), and (X6,Y4) into a region (hereinafter, may be referred to as a "left region") located on the left side of the face image center CE and a region (hereinafter, may be referred to as a "right region") located on the right side of the face image center CE, with respect to the face image center CE. Therefore, in the example illustrated in FIG. 12, the display control unit 18 classifies the regions (X3,Y3), (X4,Y3), (X3,Y4), and (X4, Y4) into the left region and classifies the regions (X5,Y3), (X6,Y3), (X5,Y4), and (X6,Y4) into the right region among the face image overlapping regions (X3,Y3), (X4,Y3), (X5, Y3), (X6,Y3), (X3,Y4), (X4,Y4), (X5,Y4), and (X6,Y4). However, the display control unit 18 may exclude a region that overlaps with a vertical line that passes through the face image center CE from both of the left region and the right region in the face image overlapping region.

Furthermore, the display control unit 18 calculates an average (hereinafter, may be referred to as a "left region luminance average") of luminance of a plurality of pixels included in the left region and an average (hereinafter, may be referred to as a "right region luminance average") of luminance of a plurality of pixels included in the right region. Moreover, the display control unit 18 calculates a difference (hereinafter, may be referred to as a "left-right region luminance difference") between the left region luminance average and the right region luminance average, and determines whether the left-right region luminance difference is equal to or larger than a threshold THA. Furthermore, when the left-right region luminance difference is equal to or larger than the threshold THA, the display control unit 18 determines a magnitude relationship between the left region luminance average and the right region luminance average. Then, when the left region luminance average is larger than the right region luminance average, the display control unit 18 requests the imaging target person to turn the face of the imaging target person left. In contrast, when the right region luminance average is larger than the left region luminance average, the display control unit 18 requests the imaging target person to turn the face of the imaging target person right.

Examples of a notification about a face turning direction to the imaging target person will be described below. In first to third notification examples described below, a case in which the face of the imaging target person is turned to left will be explained as one example.

First Notification Example (FIG. 15)

In the first notification example, as illustrated in FIG. 15, the display control unit 18 displays a face guide frame GF6 that has a quadrilateral shape in which a left side has a longer length than a right side, that is indicated by a dotted line, and that is colored in orange on the touch screen 12, for example. Further, the display control unit 18 displays a message of "please adjust face to frame (slightly leftward)" in the message display field MS.

Second Notification Example (FIG. 16)

In the second notification example, as illustrated in FIG. 16, the display control unit 18 displays a face guide frame GF7 that has a medium size, that is indicated by a dotted line, and that is colored in orange on the touch screen 12, for example. Further, the display control unit 18 displays a leftward arrow mark AR on the touch screen 12. Furthermore, the display control unit 18 displays a message of "please adjust face to frame (slightly leftward)" in the message display field MS.

Third Notification Example (FIG. 17)

In the third notification example, as illustrated in FIG. 17, the display control unit 18 displays a face guide frame GF7 that has a medium size, that is indicated by a dotted line, and that is colored in orange on the touch screen 12, for example. Further, the display control unit 18 displays an animation AM that mimics a person who changes an orientation of a face from front to left on the touch screen 12. Furthermore, the display control unit 18 displays a message of "please adjust face to frame (slightly leftward)" in the message display field MS.

Thus, the first to the third notification examples have been described.

As described above, when the luminance difference between the left and the right in the face image FI is equal to or larger than the threshold THA, it is possible to request the imaging target person to turn the face of the imaging target person left or right in which the luminance is higher, so that it is possible to reduce the luminance difference between the left image FA and the right image FB and it is possible to prevent reduction of accuracy of personal authentication.

Meanwhile, the fourth embodiment may be implemented by combination with the first embodiment, the second embodiment, or the third embodiment. When the fourth embodiment is implemented by combination with the first embodiment, the second embodiment, or the third embodiment, the display control unit 18 displays the face guide frame GF at a certain position in accordance with the first embodiment.

Thus, the fourth embodiment has been described above.

[e] Fifth Embodiment

<Authentication Program>

All or part of processes performed by the authentication apparatus 10 may be implemented by causing a processor included in the authentication apparatus 10 to execute a program corresponding to each of the processes. For example, the program corresponding to each of the processes performed by the authentication apparatus 10 may be stored in a memory included in the authentication apparatus 10. Furthermore, for example, the program corresponding to each of the processes performed by the authentication apparatus 10 may be stored in a program server that is connected to the authentication apparatus 10 via an arbitrary network, and may be executed by being downloaded to the authentication apparatus 10 from the program server. Moreover, for example, the program corresponding to each of the processes performed by the authentication apparatus 10 may be stored in a recording medium that is readable by the authentication apparatus 10, and may be executed by being read from the recording medium.

Thus, the fifth embodiment has been described.

[f] Sixth Embodiment

<Configuration of Authentication Apparatus>

In the first to the fifth embodiments, the examples have been described in which the authentication apparatus 10 includes the camera 11 and the touch screen 12. However, the authentication apparatus 10 need not always include the camera 11 and the touch screen 12. When the authentication apparatus 10 does not include the camera 11 and the touch screen 12, the camera 11 and the touch screen 12 are connected to the authentication apparatus 10 in a wired or wireless manner. Furthermore, it may be possible to use a display and a mouse instead of the touch screen 12.

Thus, the sixth embodiment has been described.

Meanwhile, in the embodiment, the personal authentication using the face image that is registered in the IC card has been described as one example. However, the disclosed technology may be applied to personal authentication using a face photograph that is included in an identity verification document, such as a driver's license or a passport. When personal authentication using a face photograph included in the identity verification document is to be performed, the authentication apparatus 10 includes a camera (hereinafter, may be referred to as a "face photograph capturing camera") for capturing the face photograph included in the identity verification document, and performs personal authentication on the imaging target person of the camera 11 by checking whether a face image that is captured by the face photograph capturing camera matches a face image that is captured by the camera 11.

As described above, an authentication apparatus of the present disclosure (the authentication apparatus 10 of the embodiment) includes a camera (the camera 11 of the embodiment), a display unit (the touch screen 12 of the embodiment), a control unit (the display control unit 18 of the embodiment), and an authentication unit (the personal authentication unit 17 of the embodiment). The camera captures an image (the camera image CI of the embodiment) that includes a face image (the face image FI of the embodiment) that is an image of a face of an imaging target person. The display unit displays the face image. The control unit causes the display unit to display a guide frame (the face guide frame GF of the embodiment) for guiding the imaging target person to an imaging position of the face of the imaging target person, based on a display position of the face image in the display unit. The authentication unit performs personal authentication using the face image when the face image is located within the guide frame.

For example, the control unit causes the display unit to display the guide frame such that an upper side of the guide frame coincides with the head top of the face image.

With this configuration, it is possible to adjust a height of the display position of the guide frame for the imaging target person in the personal authentication using the face image in accordance with the height of the imaging target person, so that the imaging target person is able to smoothly perform personal authentication even when the imaging target person has any height.

Furthermore, when the center of the face image is located within the reference range in a vertical direction of the image including the face image or located at a position below the reference range, the control unit causes the display unit to display the guide frame such that the upper side of the guide frame coincides with the head top of the face image. In contrast, when the center of the face image is located at a position above the reference range, the control unit causes the display unit to display the guide frame such that the upper side of the guide frame coincides with a position that is located lower than the head top of the face image by a predetermined amount.

With this configuration, it is possible to request a tall imaging target person to perform operation of lowering the position of the face, so that it is possible to prevent reduction in the authentication rate of the personal authentication on a tall imaging target person.

Moreover, the control unit causes the display unit to display the guide frame that has a smaller size at a higher display position of the face image in the image including the face image in the display unit.

With this configuration, it is possible to prevent reduction in the authentication rate of the personal authentication when a tall imaging target person stands at a position that is largely separated from the authentication apparatus so as to fall within the angle of view of the camera.

Furthermore, when a center of the face image is located at a position below a reference range in a vertical direction of an image including the face image and an inter-eye distance in the face image is smaller than a threshold, the control unit displays a guide frame at a predetermined position in the reference range.

With this configuration, the imaging target person need not stoop down when performing personal authentication, so that it is possible to improve usability of the authentication apparatus.

Moreover, when a center of the face image is located in a reference range in a vertical direction of an image including the face image and luminance of a peripheral image of the face image in the image including the face image is equal to or larger than a threshold, the control unit displays a guide frame at a position at which luminance is smaller than the threshold in the reference range.

With this configuration, it is possible to prevent generation of blown out highlights in the peripheral image of the face image, so that it is possible to prevent reduction of accuracy of personal authentication.

Furthermore, when a center of the face image is located within a reference range in a vertical direction of the image including the face image and a luminance difference between a left side and a right side in the face image is equal to or larger than a threshold, the control unit requests the imaging target person to turn a face of the imaging target person left or right in which the luminance is higher.

With this configuration, it is possible to reduce the luminance difference between left and right in the face image, so that it is possible to prevent reduction of accuracy of personal authentication.

According to the disclosed technology, even if an imaging target person has any height, the imaging target person is able to smoothly perform personal authentication.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An authentication apparatus comprising:
a camera configured to acquire an image including a face of a person;
a display configured to display the image including the face; and
a processor configured to:
identify whether (1) a predetermined position of the face in the image is located within a reference range in a vertical direction of the image, (2) the predetermined position of the face is located below the reference range, or (3) the predetermined position of the face is located above the reference range;

determine a display position or a display size of a guide frame based on the identified predetermined position of the face in the image;
display the guide frame on the determine display position in the display, the guide frame being for guiding the person to move his/her face so that the face in the image is located within the guide frame; and
in response to determining that the face in the image is located within the guide frame, perform personal authentication using the face within the guide frame.

2. The authentication apparatus according to claim 1, wherein the image includes a first edge and a second edge opposite the first edge, and
wherein based on the position of the face identified between the first edge and the second edge, the processor is configured to determine a position to display the guide frame between the first edge and the second edge.

3. The authentication apparatus according to claim 2, wherein the guide frame includes a third edge and a fourth edge opposite the third edge, the third edge being closer to the first edge of the image than the fourth edge when the frame is displayed on the display, and
wherein the processor is configured to arrange the guide frame within the image so that a distance between the first edge of the image and the third edge of the guide frame is equal to a distance between the first edge of the image and a head top of the face in the image.

4. The authentication apparatus according to claim 2, wherein the guide frame includes a third edge and a fourth edge opposite the third edge, the third edge being closer to the first edge of the image than the fourth edge when the frame is displayed on the display,
wherein the processor is configured to arrange the reference range between the first edge and the second edge of the image,
wherein when (1) the predetermined position of the face is located within the reference range or (2) the the predetermined position of the face is located outside the reference range and in a first area between the reference range and the second edge of the image, the processor is configured to arrange the guide frame within the image so that a distance between the first edge of the image and the third edge of the guide frame is equal to a distance between the first edge of the image and a head top of the face in the image, and
wherein when the predetermined position of the face is located outside the reference range and in a second area between the reference range and the first edge of the image, the processor is configured to arrange the guide frame within the image so that the distance between the first edge of the image and the third edge of the guide frame is greater than the distance between the first edge of the image and the head top of the face in the image.

5. The authentication apparatus according to claim 2, wherein the processor is configured to display the guide frame so that the closer the identified position of the face is to the first edge of the image, the larger the display size of the guide frame.

6. The authentication apparatus according to claim 2, wherein the processor is configured to arrange the reference range between the first edge and the second edge of the image,
wherein the processor is configured to determine whether a distance between eyes in the face of the person in the image is smaller than a threshold, wherein when (1) the predetermined position of the face is located outside the reference range and in a first area between the reference range and the second edge of the image, and (2) the distance between eyes in the face of the person in the image is smaller than the threshold, the processor is configured to display the guide frame within the reference range.

7. The authentication apparatus according to claim 2, wherein the processor is configured to arrange the reference range between the first edge and the second edge of the image, wherein the processor is configured to determine whether luminance of a first area around the face in the image is equal to or greater than a threshold, and find a second area in the reference range having luminance less than the threshold in response to determining that the luminance of the first area is equal to or greater than the threshold, and wherein when (1) the predetermined position of the face is located within the reference range and (2) the luminance of the first area is equal to or greater than the threshold, the processor is configured to display the guide frame in the second area within the reference range.

8. The authentication apparatus according to claim 2, wherein the processor is configured to arrange the reference range between the first edge and the second edge of the image, wherein the processor is configured to determine that a difference between luminance of a left side of the face and luminance of a right side of the face is equal to or greater than a threshold, wherein when (1) the predetermined position of the face is located within the reference range and (2) the difference is equal to or greater than the threshold, the processor is configured to display a message on the display to request the person to turn to the left side or the right side which has the luminance greater than another.

9. A method for displaying a guide frame, the method comprising:

acquiring an image including a face of a person;

displaying the image including the face;

identifying whether (1) a predetermined position of the face in the image is located within a reference range in a vertical direction of the image, (2) the predetermined position of the face is located below the reference range, or (3) the predetermined position of the face is located above the reference range;

determining a display position or a display size of a guide frame based on the identified predetermined position of the face in the image;

displaying the guide frame on the determined display position the display, the guide frame being for guiding the person to move his/her face so that the face in the image is located within the guide frame; and in response to determining that the face in the image is located within the guide frame, performing personal authentication using the face within the guide frame.

10. A non-transitory computer-readable recording medium storing instructions, when executed by a processor, causing the processor to:

acquire an image including a face of a person;

display the image including the face; and identify whether (1) a predetermined position of the face in the image is located within a reference range in a vertical direction of the image, (2) the predetermined position of the face is located below the reference range, or (3) the predetermined position of the face is located above the reference range;

determine a display position of a guide frame based on the identified predetermined position of the face in the image;

display the guide frame on the determined display position in the display, the guide frame being for guiding the person to move his/her face so that the face in the image is located within the guide frame; and in response to determining that the face in the image is located within the guide frame, perform personal authentication using the face within the guide frame.

11. The authentication apparatus according to claim 1, wherein when (1) the predetermined position of the face is located within the reference range in the vertical direction of the image or (2) the predetermined position of the face is located below the reference range, the processor is configured to arrange the guide frame within the image so that an upper side of the guide frame coincides with a head top of the face in the image, and wherein when the predetermined position of the face is located above the reference range, the processor is configured to arrange the guide frame within the image so that the upper side coincides with a position that is located lower than the head top of the face by a predetermined amount.

\* \* \* \* \*